Patented May 18, 1948

2,441,637

UNITED STATES PATENT OFFICE 2,441,637

WOOD BATTERY SEPARATOR AND METHOD OF MAKING THE SAME

Richard A. Kaumeyer, Pacific Palisades, and Joseph Rabb, Jr., West Los Angeles, Calif., assignors to Evans Products Company, Detroit, Mich., a corporation of Delaware No Drawing. Application August 9, 1945, Serial No. 609,944

2 Claims. (Cl. 136—149)

This invention relates to improved wood battery separators and the novel process for their production.

In the prior art practice in respect to the provision of wood battery separators for storage batteries of the lead sulfuric acid type, there has grown up the practice embracing an initial treatment of the wood battery separators by leaching with acid or alkali to remove deleterious substances therefrom and impart to the wood battery separator the requisite electrical characteristics. Following such initial treatment, the battery separators are usually transported to the point of assembly in the battery. This is often a time-consuming period and it has been found necessary to prevent the drying out of the battery separators following the leaching treatment and prior to assembly in the battery. Specifically, when the leached battery separators are permitted to dry out they warp, crack and otherwise become unsuitable for use.

There has more lately arisen a practice, due to military demands, of assembling the elements of the cells of storage batteries and transporting the batteries in a dry condition to the point of use where the electrolyte is added, the battery, so to speak, completed and conditioned for use.

It is among the purposes of the present invention to provide a wood battery separator that can be dried at the point of its manufacture, transported in a dried condition and, if desired, assembled into the battery in a dry condition, and to also provide an efficacious process for the production of battery separators possessing these desirable characteristics. It is a further and more specific object of the invention to produce wood battery separators that can be transported dry, that will possess the requisite electrical characteristics to insure their efficient performance in the lead sulfuric acid type storage battery and that will have a long life in use.

Coming to a more detailed description of the present invention, it has been found that in order to obtain wood battery separators of the requisite electrical characteristics for use in lead sulfuric acid type storage batteries, the initial wood separators must be subjected to a leaching treatment, usually a cooking with sodium hydroxide solution to the point of extracting from the wood separator some 24 to 26 percent by weight of its original components. The purpose of this leaching or extraction operation is two-fold: first, to remove from the wood those components thereof which have a deleterious effect upon the functioning of the storage battery, and, second, to reduce the ohmic resistance of the separator to that required for efficient use.

In this connection the term "ohmic resistance" is used to define the ion transmissibility of the battery separator when in the electrolyte solution simulating the conditions in a storage battery, that is, the resistance is a measure of the voltage drop across the separator in an electrolyte solution.

While the extent of removal of components of the orignal wood battery separator is not altogether critical, it has been found that a removal of such components in the order of from 22 to 28 percent by weight on a bone-dry basis of wood will generally be found satisfactory. The extent to which such components are removed from the original wood battery separator should be governed by the two primary factors: first, these components should not be removed to such an extent as to destroy the structure of the wood; and, second, they should be removed to a degree sufficient to reduce the ohmic resistance to that required. It has been found that when the deleterious components of the wood have been removed to a degree adequate to yield a separator having an electrical resistance within the range of from .0010 to .0018 ohm per square inch, the preliminary requirements of the process of the instant invention are satisfactorily met.

A satisfactory preliminary treatment for the wood battery separators embraces the initial cooking thereof in a sodium hydroxide solution of a strength of from .75 per cent to 3 percent and in a ratio of from approximately .8 to 1.5 gallons of solution per pound of wood treated. The temperature of the cooking operation is of the order of 200° F. and the time period of the order of 10 to 12 hours. The cooking operation is followed by a washing with clear water which may advantageously embrace several one-hour washings in boiling water, followed by several hours washing with cold rinse water.

In accordance with the present invention, the wood storage batteries, from which the deleterious substances have been leached, are next subjected to an impregnation treatment to impart thereto the necessary characteristics to permit of the drying of such wood separators while retaining their dimensional stability and to insure that they may be transported in a dry condition for subsequent assembly in storage batteries.

The most advantageous impregnating agent that we have so far discovered is produced by intermixing urea and sulfuric acid in such proportions and under such conditions as to yield a viscous fluid suitable for impregnation purposes. We are not altogether clear as to the precise chemical constitution of the impregnating agent employed in accordance with the present process. It has been found, however, that when urea and sulfuric acid are mixed in the absence of substantial amounts of water, a certain amount of heat is developed and that unless this heat is dissipated, unwanted reactions occur. It has been found advantageous in producing the impregnating agent employed in accordance with the present invention to mix the urea and sulfuric acid in molecular portions within the limits of from 2 to 4 mols of urea to one mol of sulfuric acid and to employ sulfuric acid of about 60° Baumé strength. The evolution of heat flowing from the admixture of the urea and sulfuric acid should be so controlled as to maintain the temperature of the admixture below approximately 80° C. It has been observed that when this temperature is allowed to rise considerably above this limit, the sulfuric acid is neutralized and gases are developed from the mixture indicating that decomposition and other changes of the urea are taking place.

It is believed that the impregnating agent produced by the admixture of controlled quantities of urea and sulfuric acid under closely controlled temperature conditions constitutes essentially a mixture of these components in which both are present approximately in their initial form, especially since the acidity of the admixture corresponds to that of the amount of sulfuric acid originally introduced. After the undesired reactions described above occur, the product is substantially neutral or, depending on the molecular proportions, either slightly acidic or slightly alkaline. The bulk of the acid, however, has been converted into neutral salts of ammonia, while part of the urea has undergone condensations to products of higher molecular weight. In the impregnating material that is preferred for the present purpose, this secondary transformation has not been allowed to occur to any large extent. However, small proportions of the components in the urea and sulfuric acid admixture may have undergone the change into ammonia salt and the condensation product of urea. Among these condensation products biuret is present.

One exemplary procedure for obtaining an effective impregnating agent for use in accordance with the present invention embraces the preparation of a stock solution made from urea and sulfuric acid admixed in the ratio of 200 parts of urea by weight to 100 parts of sulfuric acid by weight. These components are mixed with constant stirring and the temperature so controlled as not to rise substantially above 80° C. The mixing is continued until a homogeneous mixture is obtained, whereupon the solution is cooled, preferably through the employment of a water bath, until it reaches room temperature. For purposes of use in the impregnating operation, a stock solution prepared in the manner described above is preferably cut with water to yield approximately a 30 percent solution, which is suitable for impregnating purposes. The 30 percent solution thus obtained is practical for use in impregnating operations using approximately 1.3 to 1.5 gallons of solution to each pound of wood being impregnated.

An alternative method of preparing a suitable impregnating solution resides in adding the components separately to water in the desired proportions. It is immaterial for this purpose whether the sulfuric acid or the urea is first added to the water. In certain cases where it is preferred to use the impregnating solution at elevated temperature, the heat of dilution obtained in adding the sulfuric acid to water can be obtained and made use of.

The extent to which wood battery separators are impregnated with the product of admixture of urea and sulfuric acid in accordance with the present invention may vary somewhat. However, it is desirable to impregnate the battery separators to an extent sufficient to insure their retention of dimensional stability when dried for subsequent transportation and use. It has been found that when wood battery separators formed from Douglas fir are impregnated to the extent of from 35 to 45 percent by weight on a bone-dry basis of the original wood battery separator, they may be dried at an accelerated rate, for example, when thus impregnated, separators may be dried at temperatures of the order of 180° F. to 220° F. for a time period of from 15 to 30 minutes, depending upon the humidity of the atmosphere and air circulating rates in the drying operation. Where closely controlled kiln drying conditions are available, the extent of impregnation may be substantially lowered as, for example, with high quality fir the impregnation may be to no greater extent than the percent by weight removal of deleterious components of the wood by the previous leaching operation.

The conditions of impregnation are preferably maintained such that using a 30 percent solution of the impregnating agent, the ratio of wood to solution will be of the order of one pound of wood on a bone-dry basis to from 1.2 to 1.5 gallons of solution with the temperature of the solution maintained slightly elevated and of the order of 140° F. to 150° F. The time required for impregnation may vary somewhat, but a period running from 2 to 4 hours will usually be found satisfactory, depending upon the conditions of circulation of the impregnating fluid through the body of the battery separators under treatment, and the degree of impregnation desired. Following the impregnation treatment, the separators are removed from the impregnating bath and dried. The drying may be conducted at room temperature or it may be accelerated by the use of oven or kiln drying. In the latter instance, the temperature may well be of the order of 180° F. However, as above explained, when a high degree of impregnation has been effected, higher temperatures may be resorted to to the end that the drying time may be materially accelerated. It has been found that the drying is advantageously carried down to approximately 8 to 14 percent moisture content.

The dried battery separators thus produced are characterized in that they have a remarkable dimensional stability, a high degree of flexibility, and possess the characteristics necessary to stand the handling incident to transportation and assembly in the storage battery. Additionally, they possess characteristics rendering them highly efficient when subjected to the action of the electrolyte in the storage battery.

Battery separators produced in accordance with the present invention may be employed in the manufacture of storage batteries in either of two alternative procedures. First, where batteries are required for rigorous climatic conditions such as in the polar regions, the battery separators may advantageously be subjected to a water boiling treatment prior to assembly in the storage battery. For example, it has been found that the electrical resistance of the battery separators may be materially lowered and rendered stable under extremely low temperature conditions by subjecting the battery separators to boiling in water for a period of approximately 30 minutes prior to assembly in the battery. The alternative procedure entails the assembly of the battery separators into the battery cells in dry form. In the latter case the impregnating agent will be found compatible with the electrolyte and the battery thus produced is highly efficacious for ordinary use.

As mentioned above, the dried battery separator is not only flexible, but, in most cases at least, even lighter in color than the separator subsequent to the leaching operation above described. If the wood is impregnated with the amount of sulfuric acid corresponding to that present in the wood treated according to the invention, even on careful drying the wood turns dark and is partially carbonized. The presence of the urea prevents this destructive action of the sulfuric acid on the wood during the drying operation. The lower limit of urea to be used in proportion to the sulfuric acid is determined by this effect. It has been found that if substantially less than 2 mols of urea are present for 1 mol of sulfuric acid the destructive action of the sulfuric acid on the wood is not completely avoided. On the other hand, when urea is used in excess of 4 mols with 1 mol of the sulfuric acid, the tendency of the urea to crystallize and bloom out during the drying is observed. The partial reaction of urea with sulfuric acid which leads to ammonia salt and condensation product from urea can be expected to take place to some extent during the drying without reducing the efficiency of the impregnating mixture. This is verified by the fact that the addition of one of the products to be expected, namely biuret, has no harmful effect on the separator.

It is because of the foregoing considerations that it has been found expedient to maintain the molecular ratio of urea to sulfuric acid within the limits of from 2 to 4 mols of urea to 1 mol of sulfuric acid.

Having thus described our invention, what we claim is:

1. A wood battery separator for a lead-sulfuric acid type battery and possessing requisite dimensional stability for dry shipment comprising an initially leached preformed wood battery separator impregnated with a composition consisting essentially of an admixture of urea and sulfuric acid brought together at a temperature below approximately 80° C. in the proportions of from 2 to 4 mols of urea to 1 mol of sulfuric acid.

2. The method of producing a wood battery separator suitable for use in lead-sulfuric acid type storage batteries possessing the requisite dimensional stability to permit of dry handling and shipment, comprising the steps of leaching a preformed wood battery separator with an alkali to remove deleterious components of the wood, impregnating the leached separator with a composition consisting essentially of an admixture of urea and sulfuric acid brought together at a temperature below approximately 80° C. in the proportions of from 2 to 4 mols of urea to 1 mol of sulfuric acid, the quantity of the admixture being at least equal in weight to the weight of the deleterious components removed from the separator and drying the separators at a temperature of at least 180° F. but not more than 220° F.

RICHARD A. KAUMEYER.
JOSEPH RABB JR.

REFERENCES CITED

The following references are of record in the file of this patent:

UNITED STATES PATENTS

| Number | Name | Date |
|---|---|---|
| 2,195,134 | Rasch | Mar. 26, 1940 |
| 2,302,594 | Berliner et al. | Nov. 17, 1942 |

OTHER REFERENCES

Staff Report, Chem. and Eng. News, May, 1944, pp. 726 and 728.

Vinal, G. W., Storage Batteries, 3rd ed. (1940), p. 58.